United States Patent
Abitboul et al.

(10) Patent No.: US 12,517,706 B1
(45) Date of Patent: Jan. 6, 2026

(54) SYSTEM AND METHOD FOR IDENTIFYING LIBRARIES FOR APPLICATION RUNTIME ENVIRONMENT

(71) Applicant: R.C.Raven Cloud LTD, Tel Aviv-Jaffa (IL)

(72) Inventors: Roi Abitboul, Mountain View, CA (US); Guy Franco, Tel Aviv (IL); Shani Goldberg, Tel Aviv (IL); Omer Yair, Ramat Gan (IL)

(73) Assignee: R.C. Raven Cloud LTD, Tel Aviv-Jaffa (IL)

( * ) Notice: Subject to any disclaimer, the term of this patent is extended or adjusted under 35 U.S.C. 154(b) by 0 days.

(21) Appl. No.: 18/953,574

(22) Filed: Nov. 20, 2024

(51) Int. Cl.
- *G06F 9/44* (2018.01)
- *G06F 8/36* (2018.01)
- *G06F 21/51* (2013.01)

(52) U.S. Cl.
CPC ............... *G06F 8/36* (2013.01); *G06F 21/51* (2013.01)

(58) Field of Classification Search
None
See application file for complete search history.

(56) References Cited

U.S. PATENT DOCUMENTS

| | | | |
|---|---|---|---|
| 7,849,509 B2 | 12/2010 | Venkatapathy et al. | |
| 12,067,122 B2 | 8/2024 | Shaver et al. | |
| 2015/0100940 A1* | 4/2015 | Mockus | G06F 8/70 717/101 |
| 2017/0372068 A1 | 12/2017 | Zimmerman | |
| 2019/0079734 A1* | 3/2019 | Kadam | G06F 21/577 |
| 2019/0205543 A1 | 7/2019 | Wei et al. | |
| 2020/0167476 A1* | 5/2020 | Boulton | G06F 21/563 |
| 2020/0202007 A1* | 6/2020 | Nagaraja | G06F 11/3684 |
| 2021/0117185 A1* | 4/2021 | Abadi | G06F 8/36 |
| 2022/0237300 A1* | 7/2022 | Regev | G06F 16/245 |
| 2022/0382877 A1* | 12/2022 | Griffin | G06F 8/75 |
| 2024/0385823 A1* | 11/2024 | Hoole | G06F 8/65 |

FOREIGN PATENT DOCUMENTS

CN 112699377 A 4/2021

\* cited by examiner

*Primary Examiner* — Bradley A Teets
*Assistant Examiner* — Lanny N Ung
(74) *Attorney, Agent, or Firm* — M&B IP Analysts, LLC

(57) ABSTRACT

A system and method for identifying open source software (OSS) libraries for an application runtime environment is presented. The method includes receiving an identifier representing a function of the application runtime environment as a sequence of bits; querying a tree-like data structure using the received identifier; matching a portion of the identifier to a first key of the data structure that has a prefix of the identifier; and identifying a library of the function represented by the received identifier.

16 Claims, 4 Drawing Sheets

SYSTEM AND METHOD FOR IDENTIFYING LIBRARIES FOR APPLICATION RUNTIME ENVIRONMENT

TECHNICAL FIELD

The present disclosure relates generally to cloud computing and, in particular, to systems and methods for identifying open source software libraries from application runtime environments.

BACKGROUND

Open source software (OSS) is software whose source code is made freely available for anyone to view, modify, and distribute. This collaborative approach fosters innovation and allows users to customize the software to meet their specific needs while benefiting from community support and contributions. The OSS is highly customizable in that developers (or users) can easily modify the source code to fit their specific needs, which allows for tailored solutions that might not be possible with closed-source software. Moreover, OSS often adheres to open standards thereby allowing greater freedom in choosing complementary tools and technologies. That is, the OSS is highly accessible and versatile without the added financial constraint. To this end, OSS is widely utilized, where some report that more than 80% of applications today adopt OSS components, libraries, and frameworks in their application development.

However, it has been identified that the OSS's cost efficiency and availability also raises several cybersecurity challenges. One significant issue is the potential for vulnerabilities in the code that may go unnoticed due to the varied levels of scrutiny across different projects. While many OSS projects benefit from community contributions and peer reviews, not all receive the same level of attention, leading to some vulnerabilities remaining unpatched for extended periods. Another concern is the risk of malicious code being inserted into the software. Since OSS allows anyone to contribute, there's a possibility of introducing backdoors or other security flaws, especially if contributors to the OSS projects are not thoroughly vetted. This can be particularly problematic in widely used libraries, where a single compromised component can affect many applications. Moreover, OSS projects rely on numerous external libraries, and vulnerabilities at any of these dependencies, can expose the entire application to risk. Such factors in combination highlight the need for careful management and auditing when utilizing OSS in any system.

Some current solutions to identify vulnerabilities in OSS include automated tools like static analysis and dependency scanning, which analyze code and libraries for known security issues, in combination with vulnerability databases. Such solutions have been identified to often produce false positives or false negatives, which can lead to either unnecessary alerts or overlooked vulnerabilities. Moreover, incomplete information and sheer volume of vulnerabilities across OSS libraries creates challenges.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identifying libraries for an application runtime environment. The method comprises: receiving an identifier representing a function of the application runtime environment as a sequence of bits; querying a tree-like data structure using the received identifier; matching a portion of the identifier to a first key of the data structure that has a prefix of the identifier; and identifying a library of the function represented by the received identifier.

Certain embodiments disclosed herein also include a non-transitory computer readable medium having stored thereon causing a processing circuitry to execute a process, the process comprising: receiving an identifier representing a function of the application runtime environment as a sequence of bits; querying a tree-like data structure using the received identifier; matching a portion of the identifier to a first key of the data structure that has a prefix of the identifier; and identifying a library of the function represented by the received identifier.

Certain embodiments disclosed herein also include a system for identifying libraries for application runtime environment. The system comprises: a processing circuitry; and a memory, the memory containing instructions that, when executed by the processing circuitry, configure the system to: receive an identifier representing a function of the application runtime environment as a sequence of bits; query a tree-like data structure using the received identifier; match a portion of the identifier to a first key of the data structure that has a prefix of the identifier; and identify a library of the function represented by the received identifier.

Certain embodiments disclosed herein include the method, non-transitory computer readable medium, or system noted above, further including or being configured to perform the following steps: determining a risk level of the identified library based on a plurality of risk rules and a location of the function; and generating a notification of the identified library and the determined risk level.

Certain embodiments disclosed herein include the method, non-transitory computer readable medium, or system noted above, further including or being configured to perform the following steps: adding the identified library to a list of risk priorities according to the determined risk level, wherein the list of risk priorities includes a plurality of libraries identified for the application runtime environment in an order of risk levels.

Certain embodiments disclosed herein include the method, non-transitory computer readable medium, or system noted above, further including or being configured to perform the following steps: matching a first bit of the identifier to a first level node of the data structure; and sequentially mapping at least one next bit of the identifier to a series of nodes until an end node of the data structure, wherein the sequentially mapped series of nodes define the first key.

Certain embodiments disclosed herein include the method, non-transitory computer readable medium, or system noted above, wherein the first key of the data structure is unique to the identified library.

Certain embodiments disclosed herein include the method, non-transitory computer readable medium, or system noted above, wherein the identifier includes a component identifier (CID) at a front part of the portion of the identifier, and wherein the first key of the data structure starts with the CID.

Certain embodiments disclosed herein include the method, non-transitory computer readable medium, or system noted above, wherein the tree-like data structure includes a plurality of keys including the first key that shares common nodes, and wherein each key of the plurality of keys is unique to a specific library.

Certain embodiments disclosed herein include the method, non-transitory computer readable medium, or system noted above, further including or being configured to perform the following steps: detecting the identified library in a vulnerability database, wherein the identified library has a version information; declaring a cybersecurity vulnerability upon detecting the identified library in the vulnerability database; and mitigating the declared cybersecurity vulnerability.

Certain embodiments disclosed herein include the method, non-transitory computer readable medium, or system noted above, wherein detecting the identified library in a vulnerability database is prioritized for the function with a risk level greater than a predefined threshold risk value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
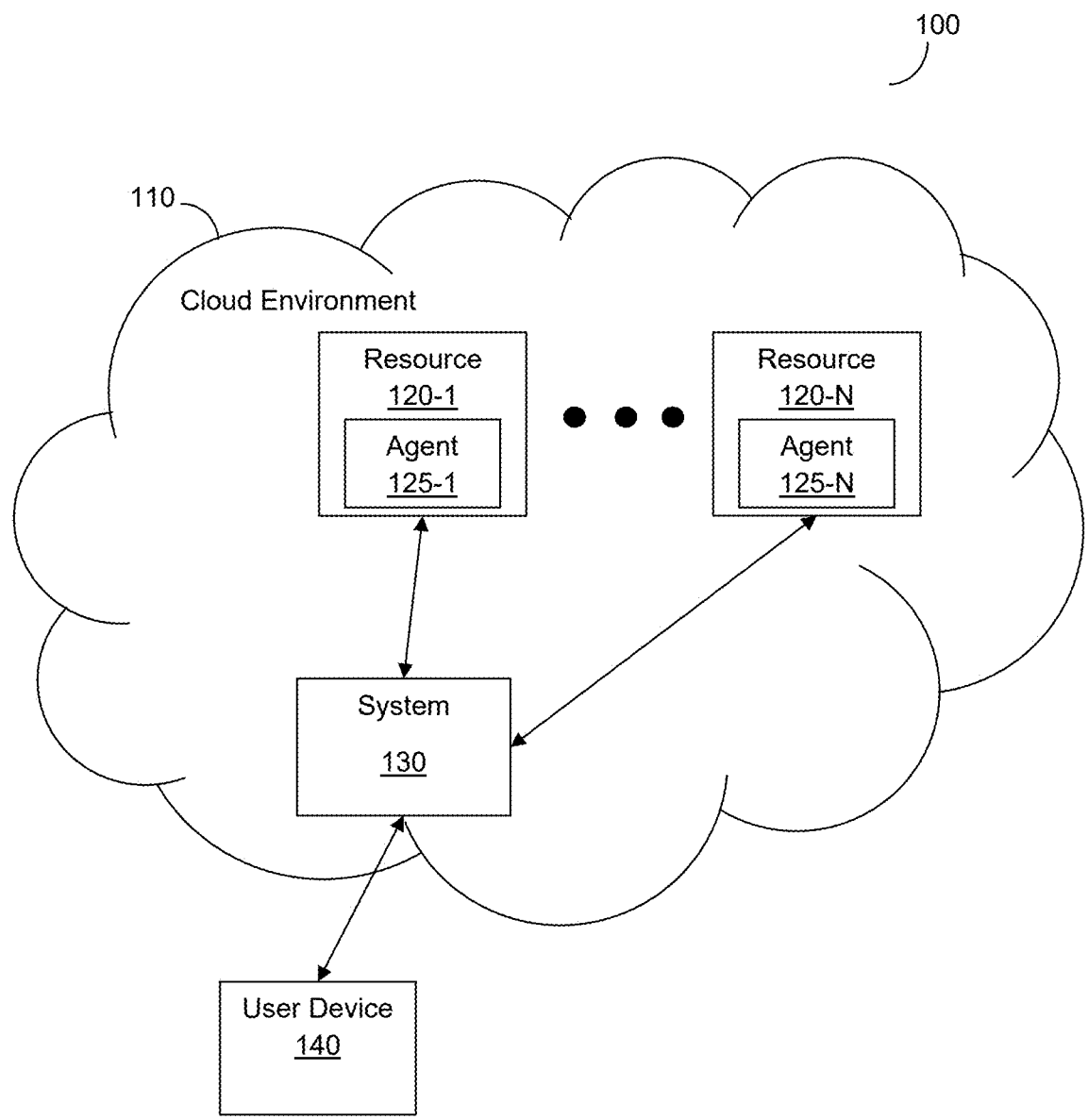
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide a system and method for identifying open source software (OSS) libraries for applications deployed at the resources. Applications implement one or more libraries for the execution of their desired workload (e.g., task, application, service, etc.). A tree-like data structure, disclosed herein, is employed to map an identifier of a function (or function code) to the OSS library from which the function code originates. The disclosed embodiments allow accurate and efficient identification of the OSS library that is otherwise not obtainable from the function code stored and utilized in one or more computing components. Moreover, the disclosed embodiments discover priorities of the identified libraries and/or functions according to their risk factor, i.e., their degree of threat or security risk to the application, the resource, and the like, and any combination thereof for efficient management and mitigation against potential vulnerabilities. The embodiments herein utilize identified OSS libraries to accurately and efficiently identify security vulnerabilities in the computing component and the resource.

It has been identified that function code in the runtime environment is stripped off of their OSS library information and attempts to identify the OSS library are resource intensive. Some current approaches perform automatic scanning of the codes to determine libraries and dependencies between them. Some other approaches simply rely on documentation or files that are stored within the code, which may not always include the library information and need, for example, manual searching, running of an algorithm, or the like. Moreover, current techniques often lack the ability to directly match the identifier of the function to the corresponding OSS library.

The data structure, disclosed herein, provides a directory of OSS libraries implemented in various applications that run on a client server or resource. The comprehensive tree-like structure disclosed herein is easily accessible for efficient matching of the identifier (or symbol) of the function code to its respective OSS library. In an embodiment, sequential bit-by-bit matchings of the data structure keys and of the identifiers are performed. Such sequential matching eliminates scanning of all entries of the OSS library against the identifier, which are resource intensive. And thus, improvements in computing speed and efficiency are provided for conservation of computing resources.

According to the disclosed embodiments, the set of keys in the data structure are prefixes of a group of functions belonging to a same library. Each key represents a unique library, where the unique library may be associated with one or more keys. The matching of the identifier against the data structure, specifically the keys, is limited to the length of the key. To this end, the matching process is reduced and limited to the length of the prefix, rather than the whole length of the identifier. That is, the disclosed embodiments not only improved computing efficiency by implementing bit comparisons using the tree-like data structure, but further by shortening the matching key. As noted above, the keys are determined for the OSS library and thus, accuracy is not compromised in the shortened prefix-based keys of the data structure.

According to the disclosed embodiments, security risk levels or risk priorities of the identified libraries to the running environment (e.g., application, application runtime environment, service, resource, infrastructure, etc.) are determined. The cybersecurity risks of OSS libraries may be largely grouped as real-risks and theoretical risks. The real-risks may be caused by OSS libraries that are executed and detected at the runtime environment, in comparison to OSS libraries that are loaded, but not executed and thus, identified as the theoretical risks. The OSS libraries identified as real-risks possess a higher risk and thus, may be prioritized for identifying specific vulnerabilities, analyzing for potential vulnerabilities. The embodiments described herein apply a plurality of risk rules based on, for example, but not limited to, function or library storage location, function execution time, frequency of library execution, and the like, and any combination thereof, to determine a risk level or priority for the identified library. That is, an objective rule-based analysis is performed to determine the security risk level and/or priority of the libraries of the resource. In some implementations, a list of priorities may be generated amongst multiple libraries that are identified from the runtime environment and utilized to effectively and efficiently address potential security risks at the resources.

Moreover, the embodiments herein allow efficient detection of vulnerability that avoids extensive searching of the vulnerability database using the identifier of the function. The vulnerabilities from the database are detected and declared based on the OSS libraries rather than the identifiers themselves. In addition, the disclosed embodiments identify the OSS library and a version of the OSS library that are deployed at the computing component, or resource. To this end, the look up of vulnerabilities in the vulnerability database may be effectively and accurately performed. As an example, such library information (e.g., library name, library version, etc.) is searched without the back steps of checking the resources. Here, additional communication and access into the resource may be avoided. It should be noted that the accurate and efficient identification of OSS libraries and vulnerabilities does not add additional burden on the resource, and thus, conserve computing and communication power at the resources.

FIG. 1 shows an example cloud diagram 100 utilized to describe the various disclosed embodiments. In the example cloud diagram 100, a plurality of cloud resources 120-1 through 120-N (hereinafter referred to individually as a resource 120 and collectively as resources 120, merely for simplicity purposes), a plurality of agents 125-1 through 125-N (hereinafter referred to individually as an agent 125 and collectively as agents 125, merely for simplicity purposes), and a system 130 communicates within a cloud environment 110. Moreover, the example cloud diagram 100 includes a user device 140 that communicates with the system 130 over a network.

The network may include, but is not limited to, a wireless, cellular or wired network, a local area network (LAN), a wide area network (WAN), a metro area network (MAN), the Internet, the worldwide web (WWW), similar networks, and any combination thereof. In some embodiments, the system 130 may be installed outside of the cloud environment 110 and communicated via the network.

The cloud environment 110 may be, but is not limited to, a public cloud, a private cloud, or a hybrid cloud. A public cloud is owned and operated by a third-party service provider that delivers computing resources for use over the internet, whereas a private cloud is cloud computing resources that are exclusively used by a single business or an organization. A hybrid cloud combines the public cloud and the private cloud that allows data and application sharing between both types of computing resources. Some examples of a cloud environment 110 may include, and without limitation, Amazon® Web Services (AWS), Microsoft® Azure, Google® Cloud Platform (GCP), and the like, which offer shared infrastructure managed by the cloud providers, providing scalability, flexibility, and reduced infrastructure management.

The user device (UD) 140 may be, but is not limited to, a personal computer, a laptop, a tablet computer, a smartphone, a wearable computing device, or any other device capable of receiving and displaying notifications. The user device 140 may receive, for example, a report, an alert, or the like, of identified OSS libraries, vulnerability information, and the like generated at the system 130 via graphical user interface (GUI) such as, but not limited to, a dashboard. The report describes, for example, but not limited to, library information (e.g., library name, library version, etc.), the identifier, the mapped key, risk levels, detected vulnerabilities, and the like, and any combination thereof that are collected for a function deployed at the cloud resource.

The cloud resources 120 are virtual components or capabilities that are provided by the cloud environment 110 to perform workloads (e.g., tasks, applications, services, functions, and the like, and any combination thereof). The resources may be rapidly provisioned and released with minimal management effect and are accessible over the internet. The cloud resource 120 may be deployed with one or more open source software (OSS) libraries that are utilized in various workloads (e.g., applications, services, etc.). The libraries or portions thereof (e.g., the function) may be processed in the runtime environment at instances. The libraries in the resources 120 may include undiscovered vulnerabilities that originate from the OSS library, placing the resource 120 at risk of exploitation. It should be noted that to ensure security at the cloud resource 120 and the cloud environment as a whole, identification and mitigation of vulnerabilities are desired.

Each of the cloud resources 120 is configured with an agent 125 (which may be realized as a piece of code stored in a memory and executed over a process of the cloud resource 120) to monitor the workload at an instance of the resource 120. The agent 125 is further configured to scan or monitor any deployed codes relevant to the respective resource 120. Such agent 125 may operate in a user mode, a kernel mode, or both. The monitored workload, codes, and the like by the agent 125 are relayed to the system 130. In an embodiment, the agent 125 retrieves a function and a corresponding identifier (e.g., a symbol in the code, or the like) and provides to the system 130 for identification of the originating OSS library and one or more vulnerabilities with respect to the provided function and identifier. The agent 125 is configured to monitor the executed functions at, for example, but not limited to, predetermined intervals, on demand, and the like, and any combination thereof. The monitoring includes scanning of the resource or a computing resource therewith for all or portions of the functions. In an embodiment, the agent 125 may separately monitor the one or more computing component (e.g., a processor, a software container, or the like) of the resource 120 for segregation of functions and may associate the monitored functions or group of functions to a component identifier (CID).

The system 130 is a component, device, and the like, in the cloud environment 110 that monitors and identifies OSS libraries, and further cybersecurity vulnerabilities, at the resources 120. The system 130 is configured to employ an identifier of a function and a data structure to determine the originating library of the function, risk levels, and associated potential vulnerabilities. The identifier of the function is received from the agent 125 deployed at the resource 120. The identifier of the function is matched against a set of keys in a data structure in order to effectively determine its associated library. The libraries may be identified for any functions deployed at the resource 120, for example, during runtime, off-line, and the like, without restrictions. To this end, the security of the resources 120 are detected for risk levels such as, but not limited to, real-time risks, theoretical risks, or both.

In an embodiment, the data structure is a directory of OSS libraries that discreetly maps the identifier of a function to a specific OSS library. In a further embodiment, the data structure is a tree-like data structure generated for a resource 120 and may be stored in a memory and/or a database (not shown) associated with the system 130. The system 130 may be communicatively connected to the database (not shown). The database may further include vulnerability databases (e.g., Common Vulnerabilities and Exposure (CVE) database, and the like) that may be retrieved and searched in order to determine the vulnerabilities of the resource 120.

In an embodiment, the system 130 may be separate from the resource and configured to process the data and functions read and provided by the agent 125. In another embodiment, the system 130 is part of the resources to perform the identification process at the monitored resource 120.

Figure 2:
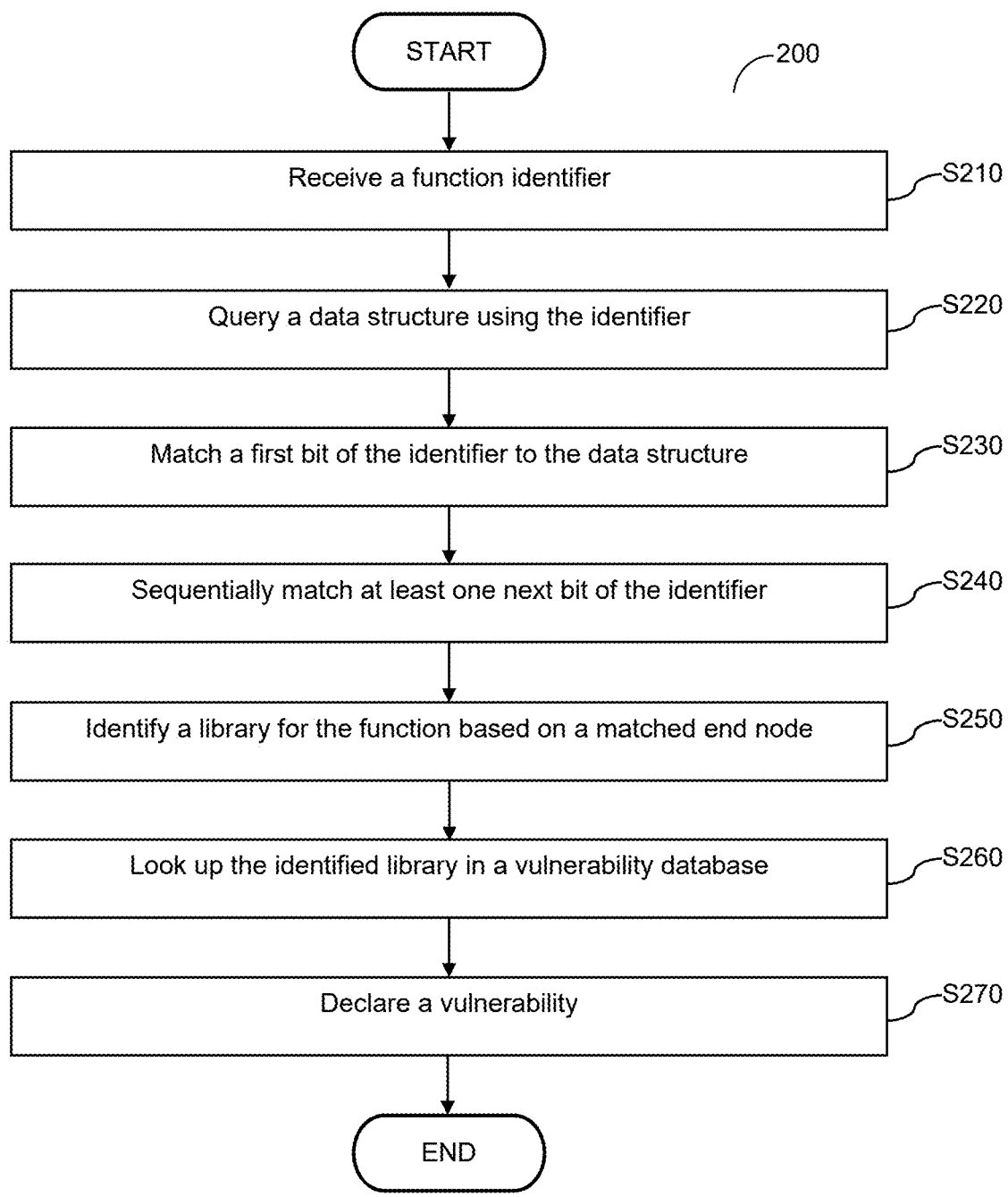
FIG. 2 is a flowchart illustrating a method for identifying an open source software (OSS) library according to an embodiment.

FIG. 2 is an example flowchart 200 illustrating a method for identifying an OSS library from an identifier (or symbol) according to an embodiment. The method described herein may be performed at the system 130, FIG. 1, which may be configured in or outside a cloud environment 110, FIG. 1. It should be noted that the method is described with respect to a single function for simplicity and does not limit the scope of the disclosed embodiments. The method may be performed for multiple functions simultaneously, consecutively, or in any order.

At S210, a function and a representative identifier are received. The function is a block of code that is part of a library deployed at the resource (e.g., the resource 120, FIG. 1). In an embodiment, the identifier (or symbol) representing the specific function is extracted and retrieved. The identifier is a sequence of bits that are unique to the function. In an embodiment, the function and its identifier are read by an agent (e.g., the agent 125, FIG. 1) deployed at the resource and configured to relay the information to the system. The identifier may be a sequence of, for example, but not limited to, bits, bytes, characters, and the like, and any combination thereof. As an example, the received identifier may include a first portion of 32 bits and a second portion of a string of characters. In an embodiment, the function and the identifier are received in real-time or near real-time as the library and/or the function is executed in runtime. In another embodiment, the deployed functions are identified off-line from a storage (not shown) in the resource. The function may be native or written in a managed programming language such as, but not limited to. Java, Python, Visual Basic .NET (VB.NET), F#, C#, and the like, and more.

At S220, a data structure is queried using the identifier. The data structure stores a set of keys representing prefixes of file paths for the libraries. That is, the functions of a same library will share a common prefix of a file path (i.e., a common key). In an embodiment, querying using the identifier searches the data structure to match the identifier to the set of keys in order to determine a corresponding library of the received function. In an embodiment, the querying identifier is the retrieved identifier representing the specific function.

In another embodiment, the querying identifier is a combined identifier that has a component identifier (CID) followed by the retrieved identifier of the specific function. Upon receipt of the function identifier, the CID of the computing component from which the function was receipt is added to the front of the identifier to create the combined identifier. The computing component is, for example, a hardware component, a software component, or the like, and any combination thereof including, for example, but not limited to, a processor, a software container, and the like, and more. In the same embodiment, the data structure being queried is generated with combined CID and prefix keys and thus, receive the combined identifier queries. Here, each key is a sequence of bits of a CID and a prefix representing a unique library.

The data structure is a tree-like structure that stores prefixes of the file paths of the functions (or libraries) that are deployed at the respective resource or a component thereof, as the key and library information as a value. Each key is a string of bits that may represent, for example, but not limited to, a letter, a number, a symbol, a space, and the like, and a combination thereof, that are sequentially ordered to represent the file path or any other identifier within the data structure. The set of keys are organized as a network of bits, where each node represents at least one bit, and common nodes are shared amongst the set of keys. In an embodiment, the data structure may be a trie data structure such as, but not limited to, a basic trie, a compressed trie (radix tree), a path-compressed trie, a ternary search tree, a dynamic trie, a directed acyclic word graph (DAWG), or the like.

A unique data structure is generated for each resource and the detailed method of generating the data structure is described in FIG. 3 herein below. In an embodiment, the data structure is stored in a memory and/or a database of the system (e.g., the system 130, FIG. 1).

At S230, a first bit (or character) of the queried identifier is matched to a node in a first level of the data structure. The first level has nodes that branch out from an empty root node. As an example, the first character of an example identifier "site-packages/Num_Py/#" is "s," which is matched to a first level node including the character "s." It should be noted that the example is shown as characters for illustrative purposes and does not limit the scope of the disclosed embodiments. The identifier may be a sequence of bits, characters, and the like, and any combination thereof.

At S240, at least one next bit of the identifier is sequentially mapped to the nodes of the data structure. The sequential matching is performed to select a next level node that corresponds to the at least one next bit of the identifier. Continuing with the example above, a second node includes at least "i", a third node includes at least "t", a fourth node includes at least "e", and so forth. In an embodiment, the sequential matching is continued down the data structure (e.g., through a series of nodes) until a matching node is unavailable. In an example embodiment, the next bit may not match with any of the nodes branching out from the last matched node. In another example embodiment, the last matched node may be an end node (or leaf node) of the data structure and no other nodes are available. The sequential matching of the identifier is common to various types of identifiers, for example, the function identifier, the combined identifier, and the like, using the corresponding data structure.

It should be noted that the matching is limited to the length of the key in the data structure. That is, in some example embodiments, the whole length of the identifier is not matched, but only the first several bits in the beginning of the identifier up to the length of the key. It should be noted that the key of the data structure is the prefix of the file path and is generally shorter in length than the length of the identifier of the specific. To this end, the number of comparison and matching of the identifier is controlled and reduced, thereby also reducing processing time and power. It should be further noted that significant conservation of computing power is achieved through the bit-by-bit comparison conducted using the tree-like data structure.

At S250, a library for the function is identified based on the last matched node. The data structure includes a library information at least the end node (or leaf node) that does not have any branches. In an embodiment, a longest prefix match is used to determine the matching key (e.g., the prefix of the file path, file name, or the like) and the last matched node for the queried identifier, and the library information is read therefrom. The library information includes, for example, but not limited to, a library name, a version of the library, and the like, and any combination thereof. The different versions of the library may include different vulnerabilities from each other. In an embodiment, the library version may be a value in the data structure. In another embodiment, the library version is identified using a second data structure that stores, for example, but not limited to, libraries, computing component information, CID, library versions, and the like, and any combination thereof. As noted above, the whole length of the identifier is not matched to the data structure since all functions with the same file path prefix belong to the same library.

In an embodiment, the risk priority or level for the identified library is determined. The risk level may be identified between higher risk to lower risk based on a plurality of risk rules defined by weights, scores, ranks, and the like of certain parameters in order to determine the cybersecurity risk impact of the identified library. In an example embodiment, the plurality of risk rules may take account of location of received function, when function is received, frequency of function execution, and the like, and any combination thereof with respect to the received function. As an example, a real-time function that is executed and received from runtime environment may be identified as a real-risk and determined to be a higher risk priority or level according to the plurality of risk rules. In another example, a function received from the storage, off-line, that has no record of execution may be determined to be a lower risk priority or level.

In some implementations, the OSS libraries identified of an application may be ranked as a list of risk priorities. A list of risk priorities may be generated of the identified libraries in the order of determined risk levels, for example, without limitation, highest risk level to lowest risk level. It should be noted that such risk priorities or levels may be utilized to prioritize certain high risk OSS libraries for vulnerability scanning and identifications, thereby providing insight and improving efficiency in cybersecurity vulnerabilities and mitigation.

At S260, the identified library is looked up in a vulnerability database. The vulnerability database may be a publicly disclosed Common Vulnerabilities and Exposures (CVE) database such as, but not limited to, the National Vulnerability Database (NVD), MITRE®'s CVE database, Exploit Prediction Scoring System (EPSS), Cybersecurity and Infrastructure Security Agency Known Exploited Vulnerabilities (CISA KEV), or the like. The look up in vulnerability database provides information on known vulnerabilities relevant to the identified library. It should be noted that the look up is performed using the identified library rather than the specific identifier that was received. To this end, the number of matchings performed with the vulnerability database is reduced to result in improved processing speed and efficiency in vulnerability detection. It should be further noted that the look up is performed with the library information such as, but not limited to, the library name, library version, and the like, and any combination thereof. The library version for the identified library is determined using one or more data structures described above.

In some embodiments, the look up of the identified library may be prioritized according to the risk level. As an example, the identified library with a high risk level, for example, above a predefined threshold risk value, highest risk level, top ranking in the list of priorities, and the like, and any combination thereof, is first looked up in the vulnerability database. Such high risk library may be a real-risk that are currently being executed in the application runtime environment.

At S270, a vulnerability is declared upon detecting the identified library in the vulnerability database. In an embodiment, a notification is generated and caused to be displayed via a user device (e.g., the user device 140, FIG. 1). The notification such as, but not limited to, an alert, a report, or the like, provide a vulnerability information including, for example, but not limited to, the library (e.g., library name, version, etc.), the identifier, the mapped key, the risk level, the detected vulnerability, and the like, and any combination thereof. It should be noted that the declaration of vulnerability is declared based on the library, which decreases false negatives in detecting vulnerabilities. The libraries including vulnerabilities are accurately and effectively detected in order to reduce vulnerability risks at the resource (e.g., the resource 120, FIG. 1).

In some embodiments, the vulnerability information collected during the library and vulnerability identifications are utilized for risk assessment, mitigation strategy, response strategy, and more. Some examples of mitigating the vulnerability include, without limitation, applying a patch, updating the resource, updating the library, changing the resource configuration, disabling services, applications, or the like, and the like, and any combination thereof.

According to the disclosed embodiments, the library identification is performed for functions that are identified via the agent and relayed to the system. The identified function may be a function deployed on at least one computing component at the resource that may or may not be loaded. In some implementations, the executed functions in the runtime environment are identified in real-time. The embodiments disclosed herein enable real-time or near real-time identification of the library and vulnerabilities associated with the executed function. It has been identified that many libraries and functions are deployed but only portions thereof are executed. As an example, it has been identified that 90% of the deployed and loaded functions are not executed.

The vulnerabilities associated with such deployed, but not loaded, functions may be referred to as theoretical vulnerabilities that are not active threats. On the other hand, the vulnerabilities of the executing functions may be considered as real risks that cause exploitation. That is, the computing component may be at the forefront, being exposed to the such vulnerabilities that exist in the executed library. In some embodiments, the mitigation of vulnerabilities associated with the executing functions are given priority over non-executing functions. In some other embodiments, the mitigation is performed only on vulnerabilities declared for executing functions. As noted above, a risk level or risk priority may be determined for the different functions using the plurality of risk rules. It should be noted that the prioritization of vulnerabilities provides a method to efficiently manage vulnerabilities. It should be further noted that the number of mitigating processes may be reduced by focusing on the mitigation of vulnerabilities associated with the executing functions.

Figure 3:
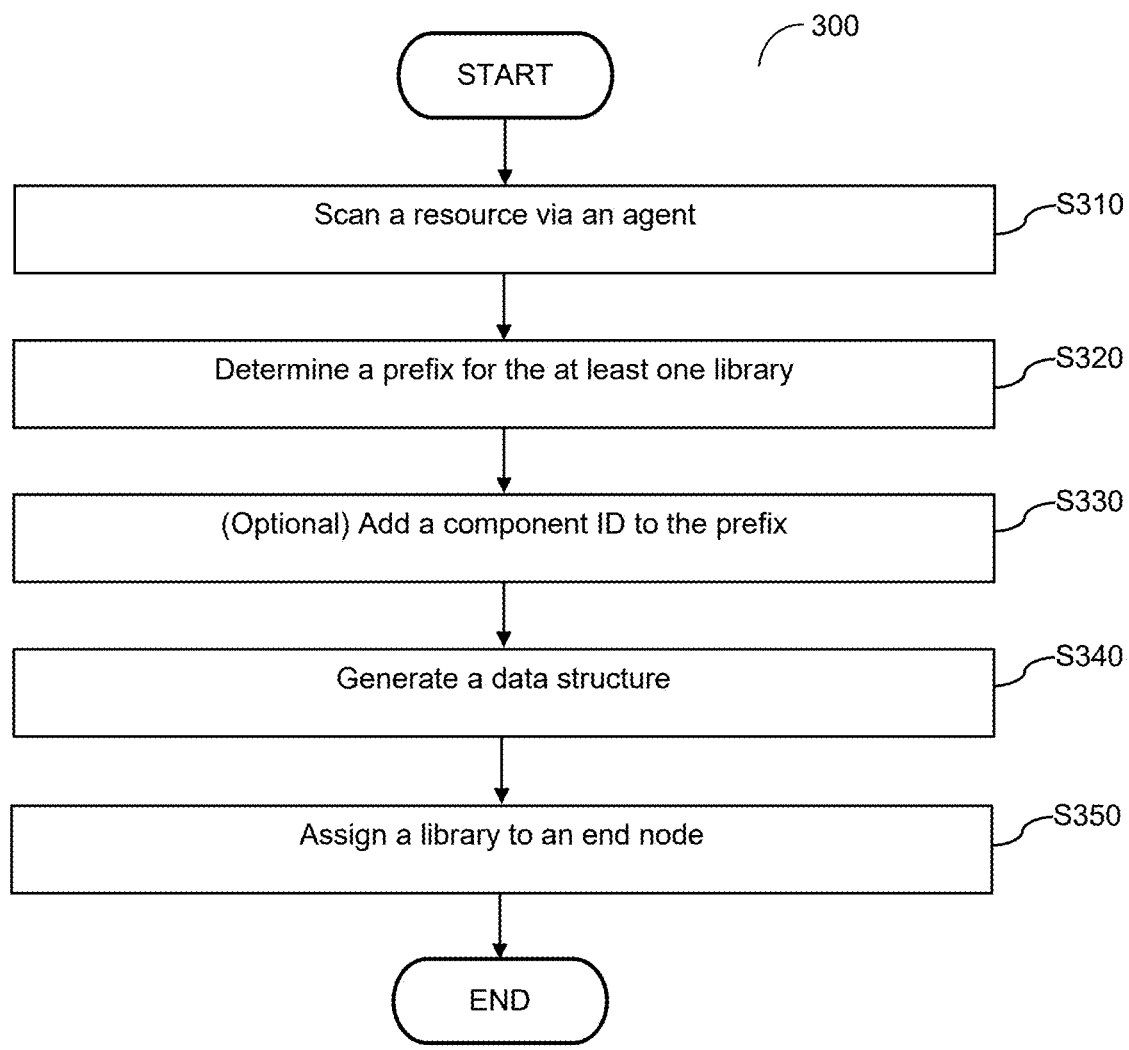
FIG. 3 is a flowchart illustrating a method for generating a data structure according to an embodiment.

FIG. 3 is an example flowchart 300 illustrating a method for generating a data structure according to an embodiment. The method described herein is performed at the system 130, FIG. 1, which may be configured in or outside a cloud environment 110, FIG. 1.

In an embodiment, the agent 125 deployed at the resource 120 is configured to scan the resources to provide information on libraries that are deployed at the respective resources. In an embodiment, the data structure is generated for each resource. In another embodiment, the data structure is generated for a group of resources. In yet another embodiment, the data structure may be generated as a global data structure that may be utilized for any resources.

At S310, a resource is scanned for at least one library via an agent (e.g., the agent 125, FIG. 1) deployed at the resource (e.g., the resource 120, FIG. 1). The agent is configured to scan, and relay scanned data to the system. In an embodiment, each computational component such as, but not limited to, software, hardware, and the like, and any combination thereof, are scanned separately to collect functions and the associated at least one library that are deployed at each of the components. In an embodiment, the scanning identifies library information such as, but not limited to, library name, version of the library, stored location, and the like, and any combination thereof. As an example, the component includes, without limitation, a software container, a processor, a process identifier, a file identifier such as an index node (iNode), a file identifier such as a hash value, and the like, and any combination thereof. Each of the computational components are defined with a component identifier (CID).

In an embodiment, the scanning of the component is performed up to the prefix or higher-level folder that defines a location of the library and includes functions of the same library. That is, scanning is not performed for every single function in the whole system, but up to a granularity that separates libraries that are deployed at the resource, thereby significantly reducing processing time and power.

At S320, a prefix is determined for the at least one library. The prefix indicates a file path of the at least one library and is applicable for a plurality of functions of the same library. A unique prefix is determined for each library of the at least one library. In some embodiments, a library may be associated with one or more unique prefixes. It should be noted that the prefix is not associated with two different libraries. In an embodiment, the determined prefix is a key and thus the scanned resource may include one or more keys representing the one or more libraries that are deployed and scanned from the component. In an example embodiment, the file path may indicate a file name, a function name, a class name, or the like.

The prefix of the library is determined based on the programming language of the library. For example, a class name of the library is used for a prefix in a Java-based library. In another example, a leaf string in the folder system is used for Python or Ruby-based libraries. In some implementations, a source binary file is scanned to determine one or more ranges of addresses indicating the library. As an example, ranges of offsets in the binary are determined for native codes of the machine language.

At S330, optionally, a component ID is added to the prefix to create a key. The key is a sequence of bits representing, for example, but not limited to, the determined prefix, the CID followed by the prefix, and the like, and more. As noted above, the deployed libraries are scanned for each computation component with a specific component identifier (CID). In an embodiment, the determined prefix is combined with the CID of the component from which the library (and prefix). In an embodiment, the determined prefix of the library is combined with the CID from which the corresponding library is deployed and scanned from. In an example embodiment, the CID is placed in front of the prefix to create a key for the library. This key defines, for example, but is not limited to, the deployed component, prefix of the library, and the library. As noted above, when the CID is not added, the key would only include the prefix of the library.

As an example, a key for a component "ABC1" and prefix "site-packages/Num_Py" is "ABC1site-packages/Num_Py." Such key is associated with the specific library "Num_Py" that is deployed in component "ABC1." In such a scenario, functions of library "Num_Py" that is deployed or executed at a different component, does not match this specific key for component "ABC1." The example is shown using characters (e.g., numerical, letters, etc.) for illustrative purposes and does not limit the scope of the disclosed embodiments, the key may be a sequence of bit indicating, for example, but not limited to, letters, numbers, symbols, and the like, and any combination thereof).

At S340, a data structure is generated by combining the set of keys for the resource. In an embodiment, the data structure includes keys created for all servers in the resource. That is, a single data structure is created for the resource. The data structure is a tree-like structure or network with each node representing at least one bit of the keys. Each of the keys are represented as a matching path to be traversed from the top to the bottom-most end node along the path. The consecutive sequence of bits in the key are represented as sequential nodes that are combined to denote the complete key. It should be noted that the data structure organizes a set of keys (e.g., prefixes, etc.) and not the whole identifier, thereby reducing the size of the data structure and conserving computational resources such as the memory.

The data structure is generated from the top of the structure to add a first bit of the key, followed by the next bit of the key to the next level. In an example embodiment, one bit is added as a child node that branches out from the node belonging to the level above. Common bits of the key are added as a commonly shared node. As an example, if the first bit for all the keys (e.g., prefix, CID and prefix, or the like), is "s," a common single node with the bit "s" is generated as the top-most node of the data structure. The next level of nodes that branch out includes the next bits of the plurality of keys. As an example, if there are two keys in the set where the first two letters are "si" and "st," the first node has the bit "s" with two child nodes branching out, each to include "i" and "t." The data structure is a bit-by-bit sequential representation of the keys determined for the resource. In an embodiment, the data structure is a trie data structure including, but not limited to, a basic trie, a compressed trie (radix tree), a path-compressed trie, a ternary search tree, a dynamic trie, a directed acyclic word graph (DAWG), or the like.

In an embodiment, the data structure is generated for, for example, a server, a component, a resource, and the like, and any combination thereof. In another example embodiment, the data structure is generated for a plurality of resources and may be utilized as a global data structure.

In some embodiments, a second data structure to store versions of the libraries deployed at the different components are generated for each of the resources. In such a case, the optional combination of the CID to the key, in S330, may not be omitted. The library and component ID (CID) is associated with the version of the respective library, as different components may include different versions of the same library. In an example embodiment, the second data structure is employed to identify the version of the library, upon determination of the library and the component (or CID) from a received function. The second data structure is stored in a memory and/or a database associated with the system (e.g., the system 130, FIG. 1).

At S350, a library is assigned to the end node (leaf node) of the data structure. The end node of the data structure represents the last bit of the key. Thus, the data structure includes an end node for each of the keys. It should be noted that only the complete key has an associated library. In an embodiment, the assigned library includes library information such as, but not limited to, a library name, a library version, and the like, and any combination thereof.

Figure 4:
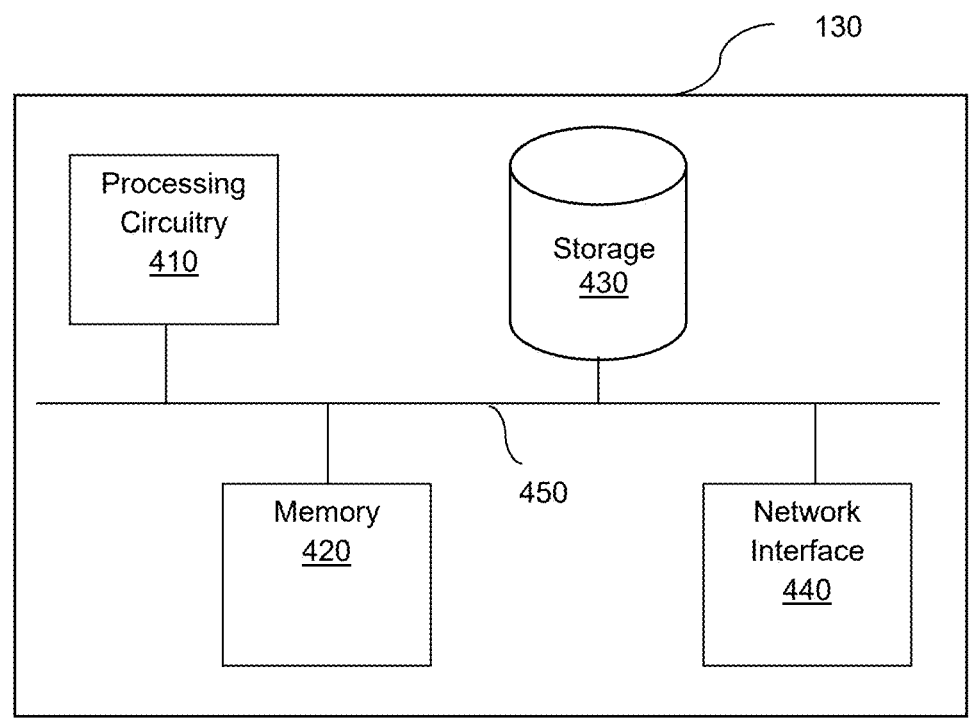
FIG. 4 is a schematic diagram of a system according to an embodiment.

FIG. 4 is an example schematic diagram of a system 130 according to an embodiment. The system 130 includes a processing circuitry 410 coupled to a memory 420, a storage 430, and a network interface 440. In an embodiment, the components of the system 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the system 130 to communicate with, for example, the resources 120, the user device 140, the databases (not shown), and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for identifying libraries for an application runtime environment, comprising:
    receiving an identifier representing a function of the application runtime environment as a sequence of bits;
    querying a tree-like data structure, having a plurality of keys, using the received identifier, wherein each key in the plurality of keys is unique to a specific library and common to a group of functions of the specific library;
    matching a portion of the identifier to a first key of the plurality of keys in the tree-like data structure, wherein the first key is a prefix segment of a file path for a first library;
    identifying the first library for the function represented by the received identifier based on the matched first key that is unique to the first library; and
    detecting the identified first library in a database indicating a cybersecurity risk in the first library; and
    causing a mitigation action on the first library in order to remove the cybersecurity risk.

2. The method of claim 1, further comprising:
   determining a risk level of the identified library based on a plurality of risk rules and a location of the function; and
   generating a notification of the identified library and the determined risk level.

3. The method of claim 2, further comprising:
   adding the identified library to a list of risk priorities according to the determined risk level, wherein the list of risk priorities includes a plurality of libraries identified for the application runtime environment in an order of risk levels.

4. The method of claim 1, wherein the matching further comprises:
   matching a first bit in the sequence of bits of the identifier to a first level node of the tree-like data structure; and
   sequentially mapping at least one next bit in the sequence of bits of the identifier to a series of nodes until an end node of the tree-like data structure, wherein the sequentially mapped series of nodes define the first key.

5. The method of claim 1, wherein the first key of the tree-like data structure is unique to the identified library.

6. The method of claim 1, wherein the identifier includes a component identifier (CID) at a front part of the portion of the identifier, and wherein the first key of the tree-like data structure starts with the CID.

7. The method of claim 1, wherein detecting the identified library in a vulnerability database is prioritized for the function with a risk level greater than a predefined threshold risk value.

8. The method of claim 1, wherein the file path is any one of: a file name, a function name, a class name, a leaf string, a binary address, and an identifier in the runtime environment.

9. A non-transitory computer readable medium having stored thereon instructions for causing a processing circuitry to execute a process, the process comprising:
   receiving an identifier representing a function of an application runtime environment as a sequence of bits;
   querying a tree-like data structure, having a plurality of keys, using the received identifier, wherein each key in the plurality of keys is unique to a specific library and common to a group of functions of the specific library;
   matching a portion of the identifier to a first key of the plurality of keys in the tree-like data structure, wherein the first key is a prefix segment of a file path for a first library;
   identifying the first library for the function represented by the received identifier based on the matched first key that is unique to the first library, and
   detecting the identified first library in a database indicating a cybersecurity risk in the first library; and
   causing a mitigation action on the first library in order to remove the cybersecurity risk.

10. A system for identifying libraries for application runtime environment, comprising:
    a processing circuitry; and
    a memory, the memory containing instructions that, when executed by the processing circuitry, configure the system to:
    receive an identifier representing a function of the application runtime environment as a sequence of bits;
    query a tree-like data structure, having a plurality of keys, using the received identifier, wherein each key in the plurality of keys is unique to a specific library and common to a group of functions of the specific library;
    match a portion of the identifier to a first key of the plurality of keys in the tree-like data structure, wherein the first key is a prefix segment of a file path for a first library;
    identify the first library for the function represented by the received identifier based on the matched first key that is unique to the first library; and
    detect the identified first library in a database indicating a cybersecurity risk in the first library; and
    cause a mitigation action on the first library in order to remove the cybersecurity risk.

11. The system of claim 10, wherein the system is further configured to:
    determine a risk level of the identified library based on a plurality of risk rules and a location of the function; and
    generate a notification of the identified library and the determined risk level.

12. The system of claim 11, wherein the system is further configured to:
    add the identified library to a list of risk priorities according to the determined risk level, wherein the list of risk priorities includes a plurality of libraries identified for the application runtime environment in an order of risk levels.

13. The system of claim 10, wherein the system is further configured to:
    match a first bit in the sequence of bits of the identifier to a first level node of the tree-like data structure; and
    sequentially map at least one next bit in the sequence of bits of the identifier to a series of nodes until an end node of the tree-like data structure, wherein the sequentially mapped series of nodes define the first key.

14. The system of claim 10, wherein the first key of the tree-like data structure is unique to the identified library.

15. The system of claim 10, wherein the identifier includes a component identifier (CID) at a front part of the portion of the identifier, and wherein the first key of the tree-like data structure starts with the CID.

16. The system of claim 10, wherein detecting the identified library in a vulnerability database is prioritized for the function with a risk level greater than a predefined threshold risk value.

* * * * *